United States Patent [19]

Young

[11] Patent Number: 4,660,441

[45] Date of Patent: Apr. 28, 1987

[54] TRANSMISSION CONTROL SYSTEM

[75] Inventor: Alastair J. Young, Kenilworth, United Kingdom

[73] Assignee: Automotive Products plc, Warwickshire, England

[21] Appl. No.: 726,403

[22] Filed: Apr. 23, 1985

[30] Foreign Application Priority Data

May 25, 1984 [GB] United Kingdom ............... 8413541

[51] Int. Cl.⁴ .................... F16H 3/08; F16H 3/26; B60K 20/14
[52] U.S. Cl. ....................................... 74/867; 74/866; 74/330; 74/336 R
[58] Field of Search ................ 74/864, 865, 866, 867, 74/330, 336 R, 336.5, 337, 359, 375, 752 A

[56] References Cited

U.S. PATENT DOCUMENTS

| | | | |
|---|---|---|---|
| 3,769,857 | 11/1973 | Whateley | 74/330 X |
| 4,442,727 | 4/1984 | Young | 74/336 R |
| 4,463,621 | 8/1984 | Fisher | 74/330 |
| 4,476,748 | 10/1984 | Morscheck | 74/334 X |
| 4,485,687 | 12/1984 | Bark et al. | 74/330 X |
| 4,513,631 | 4/1985 | Koivunen | 74/331 X |
| 4,519,484 | 5/1985 | Nagaoka et al. | 74/330 X |

FOREIGN PATENT DOCUMENTS

| | | | |
|---|---|---|---|
| 40820 | 12/1981 | European Pat. Off. | |
| 50944 | 5/1982 | European Pat. Off. | |
| 83747 | 7/1983 | European Pat. Off. | 74/330 |
| 90674 | 10/1983 | European Pat. Off. | 74/330 |
| 118355 | 7/1983 | Japan | 74/330 |
| 200837 | 11/1983 | Japan | 74/330 |
| 795260 | 5/1958 | United Kingdom . | |
| 1191826 | 5/1970 | United Kingdom . | |
| 1337772 | 11/1973 | United Kingdom . | |
| 1344150 | 1/1974 | United Kingdom . | |
| 1349936 | 4/1974 | United Kingdom . | |
| 1541178 | 2/1979 | United Kingdom . | |
| 2021712 | 12/1979 | United Kingdom . | |
| 2107805 | 5/1983 | United Kingdom | 74/330 |
| 2112088 | 7/1983 | United Kingdom . | |

Primary Examiner—Rodney H. Bonck
Assistant Examiner—John Malcolm White
Attorney, Agent, or Firm—Solon B. Kemon

[57] ABSTRACT

An electro-hydraulic control system is intended for the kind of automatic power transmission which comprises at least three forward gear ratios and in which ratio changes are effected under power by releasing one clutch interconnecting the transmission input and output through one engaged gearset simultaneously with engaging another clutch interconnecting the input and output through another engaged gearset. The control system comprises hydraulic gear actuators each for engaging and disengaging a separate gearset. Electro-hydraulic valves control the supply of hydraulic fluid to the actuators in response to ratio selection signals derived in an electronic control. One set of electro-hydraulic valve states is arranged to engage first and second gearsets while a second set of electro-hydraulic valve states is arranged to engage both second and third gearsets. Operation of the transmission in only one of the ratios associated with the two engaged gearsets is effected by holding one of the clutches disengaged while the other clutch is engaged, thus establishing drive through one and only one of the two engaged gearsets.

1 Claim, 2 Drawing Figures

TRANSMISSION CONTROL SYSTEM

BACKGROUND OF THE INVENTION

The invention relates to control systems for automatic power transmissions of the kind providing forward gear ratios, neutral and reverse gear ratios in which forward ratio changes are effected under power by releasing one clutch inter-connecting the transmission input and output through one engaged gearset simultaneously with engaging another clutch inter-connecting the input and output through another engaged gearset.

In automatic transmissions of this kind, it is normally proposed to provide electronic sensing of factors such as road speed and engine torque and from these to derive electrical signals for gear ratio selection. It is also normal to provide one hydraulically operated gear actuator for each ratio which in turn normally requires one actuator for each gearset. Power for the actuators is derived from an engine-driven pump and the control of fluid under pressure from the pump to gear actuators is effected by electro-hydraulic valves which are normally referred to as solenoid valves. Unless one solenoid valve is provided for every gear actuator, it is normal to provide one or more spool valves between the solenoid valves and the gear actuators so that some actuators are operated in response to a combination of opened solenoid valves. In this way, with a conventional arrangement, four solenoid valves are required for a transmission with four forward ratios, neutral, one reverse ratio and provision for temporary engagement of two forward ratios while changing gear.

The solenoid valves employed are relatively expensive and expense is a particularly important factor in automatic transmissions intended for motor vehicles.

An object of the present invention is to provide a control system for an automatic transmission in which the number of electro-hydraulic valves can be reduced as compared with the known arrangement described above.

SUMMARY OF THE INVENTION

According to the present invention there is provided an electro-hydraulic control system for an automatic power transmission of the kind providing at least three forward gear ratios in which ratio changes are effected under power by releasing one clutch interconnecting the transmission input and output through one engaged gearset simultaneously with engaging another clutch interconnecting input and output through another engaged gearset, the control system comprising hydraulic gear actuators each for engaging and disengaging a separate gearset, electro-hydraulic valves for controlling the supply of hydraulic fluid to the actuators in response to ratio selection signals wherein one set of electro-hydraulic valve states is arranged to engage first and second gearsets, a second set of electro-hydraulic valve states is provided to engage second and third gearsets and operation of the transmission in any one of the gear ratios is effected by engaging two gearsets and holding one of the clutches disengaged while the other is engaged whereby drive is established through only one of the engaged gearsets. When the control system is for a transmission providing four forward gear ratios it is preferred that a third set of electro-hydraulic valve states is provided to engage third and fourth gearsets. With four forward gear ratios, two electro-hydraulic valves may be provided and the three states may be: one valve open and the other closed; both valves open; the other valve open and the one closed. It is also preferred that the state corresponding to the engagement of second and third gearsets is the both valves open state.

With this arrangement it can be seen that only two electro-hydraulic valves are needed to control a four speed gearbox. Also, by having both valves open for engagement of second and third gearsets, it is possible to effect any required change of engaged gearsets by changing the state of only one electro-hydraulic valve.

The control system may be applied to a transmission also providing a reverse ratio and preferably the same set of electro-hydraulic valve states as is used for engagement of first and second gearsets is employed to engage the reverse gearset, the hydraulic supply from the valves to the actuators being routed selectively to first gear actuator or a reverse gear actuator by a transmission mode selector in dependence on whether reverse mode or a forward mode is selected.

BRIEF DESCRIPTION OF THE DRAWINGS

An embodiment of the invention will now be described by way of example only with reference to the accompanying drawing in which.

DESCRIPTION OF A PREFERRED EMBODIMENT

Figure 1:
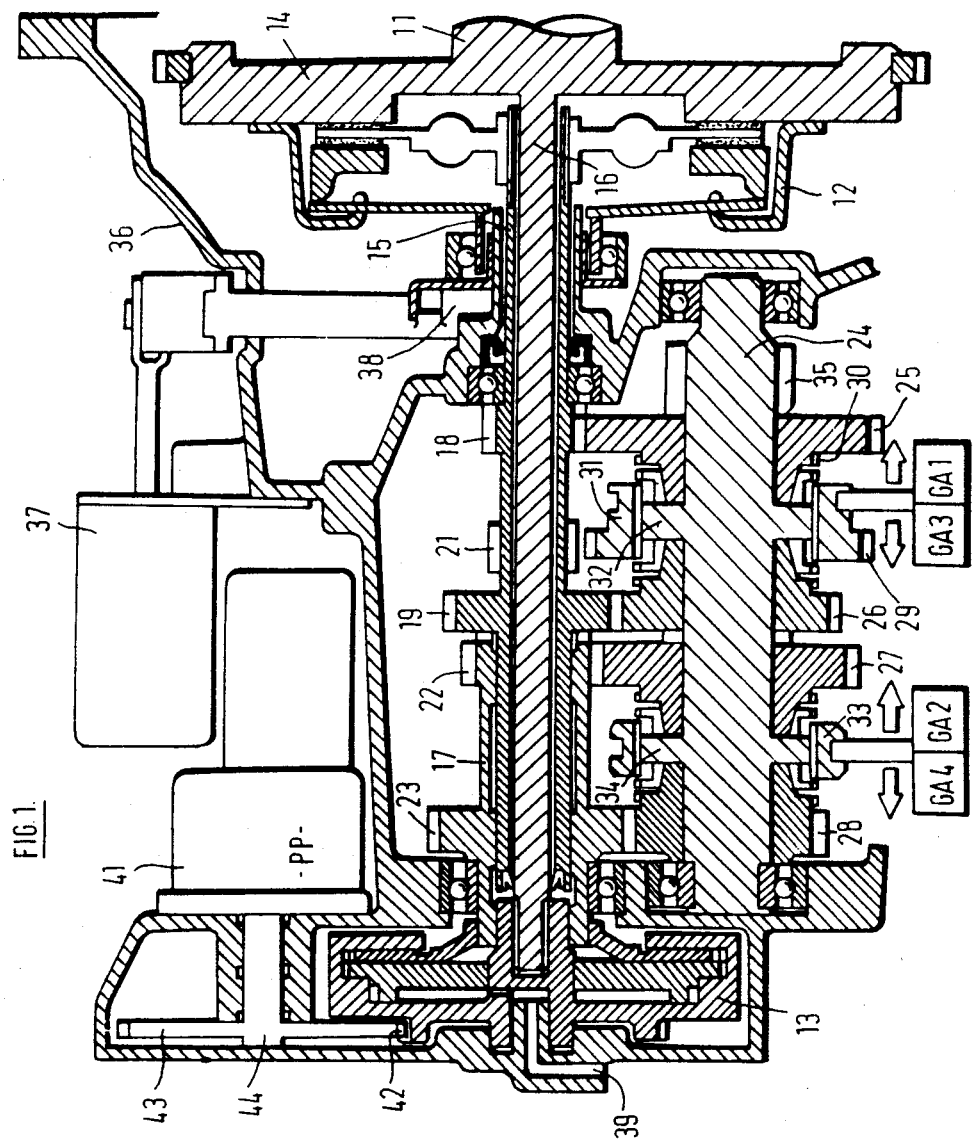
FIG. 1 is a diagrammatic layout of a transmission according to the invention.

Referring first to FIG. 1, an input shaft 11 is connected permanently to a first clutch 12 and a second clutch 13. The first clutch 12 is mounted on a flywheel 14 and when engaged drives a hollow input shaft 15. A shaft 16 passes through the hollow shaft 15 to drive clutch 13, which is a wet clutch running in oil. When clutch 13 is engaged, it drives a sleeve 17 mounted freely rotatably on an extension of shaft 15. Shaft 15 carries integral input gears 18, 19 and 21 for first, third and reverse gears respectively. Sleeve 17 carries integral input gears 22 and 23 for second and fourth gears respectively.

A lay shaft 24 carries output gears 25, 26, 27 and 28 respectively for first, third, second and fourth gear ratios. These output gears mesh respectively with input gears 18, 19, 22 and 23 to form four gearsets. All of these output gears are in themselves freely rotatable on shaft 24. A reverse output gear 29 is carried on a gear selector ring 31 which is splined to a shoulder 32 on lay shaft 24 for rotation therewith. Reverse output gear 29 can mesh with reverse input gear 21 through an idler gear, not in the plane of shafts 16 and 24 and thus not shown. A second selector ring 33 is splined to and slidable on a shoulder 34 of lay shaft 24 and is thus rotatable therewith. In neutral, the idler reverse gear is kept out of mesh with either input gear 21 or output gear 29 and all forward output gears 25 to 28 are rotatable freely on the lay shaft 24. To engage first gear, a first gear actuator GA1 moves selector ring 31 so that it engages teeth 30 of a synchromesh mechanism associated with first output gear and thus locks the first output gear 25 against rotation with respect to lay shaft 24. A similar actuator GA3 can move the same selector ring 31 to engage output gear 26 with the lay shaft and thus establish third gear. Selector ring 33 can similarly be moved by actuator GA2 and GA4 to engage second or fourth gear. A fifth gear actuator GAR (not shown in FIG. 1) is provided to inter-engage the idler gear with both reverse gears 21 and 29 to establish reverse gear ratio. Output drive from the transmission is taken from an output drive gear 35.

First and third input gears and reverse input gear are, as previously explained, mounted on hollow input shaft 15. Input drive to this shaft is by way of the dry clutch 12 so this clutch has to be disengaged while first, third or reverse is selected and then engaged to establish drive. Similarly, second and fourth input gears 22 and 23 are driven by the sleeve 17 which in turn can be driven by the wet clutch 13. Thus, to engage second or fourth gear, clutch 13 must be disengaged and when the gear has been selected the clutch is re-engaged to establish drive through the transmission in second or fourth gear.

In order to change between one forward ratio and the next higher or next lower ratio, the new ratio is selected while the old ratio is still driving. The clutch associated with the driving gear is then disengaged simultaneously with engagement of the clutch associated with the new ratio. This arrangement allows drive through the transmission to be continuous even during ratio changes.

All the elements of the transmission described so far are mounted within a housing 36. The housing carries a hydraulic cylinder 37 which is arranged to operate a release mechanism 38 for the dry clutch. Release and engagement of the wet clutch 13 is by way of hydraulic fluid supplied to an inlet 39. The casing also carries a pump and control valve assembly 41 which is driven continuously with the transmission input through a drive gear 42 at the input to the wet clutch and a further gear 43 mounted on the pump input shaft 44.

Figure 2:
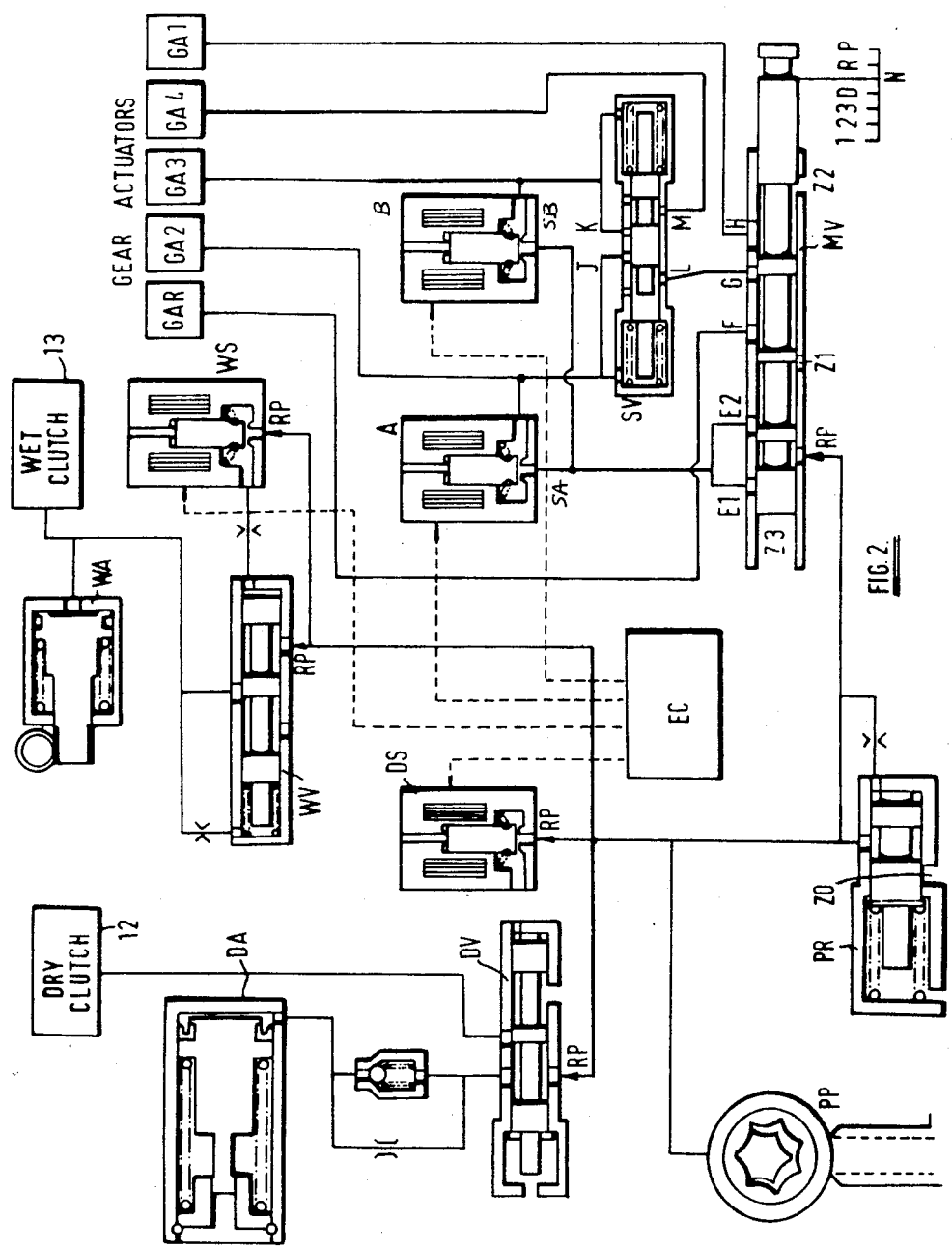
FIG. 2 is a hydraulic circuit diagram for the transmission of FIG. 1.

The hydraulic control system for the transmission is shown in FIG. 2. This hydraulic circuit provides for engagement and disengagement of the two clutches progressively and operation of the gear actuators. The transmission also incorporates an electronic control system shown diagramatically as a block EC. The electronic control system collects information from sensors such as road speed and torque demand sensors and from these inputs develops output signals to operate on various parts of the hydraulic control system to cause the hydraulic system to effect ratio changes as and when appropriate. Electronic control systems of this kind are well established in themselves and as details of such a system form no part of the present invention, the electronic control system is not described in detail.

The hydraulic circuitry incorporates a positive displacement pump PP driven (as shown in FIG. 1) from the input to the transmission. A conventional pressure regulator PR controls the output from a pump PP to a preset level and dumps excess flow to a drain port Z0. This regulated pressure is applied to the input to various parts of the control system as indicated by various arrows RP.

A manually operable transmission mode selector valve MV can be moved by an operator to set the transmission in any one of seven transmission modes. Modes 1, 2 and 3 are the selection of first, second and third gears respectively. Mode D is the normal drive mode in which a suitable forward ratio is selected automatically. Mode N represents neutral condition. Mode R represents engagement of reverse gear. Mode P is a parking mode in which a transmission lock (not shown) is engaged. Modes 1, 2, 3, D and R are driving modes whereas modes N and P are non-driving modes. The mode selector or manual valve MV receives regulated pressure and distributes fluid at this pressure selectively to output ports E1, E2, F, G and H. Ports E1 and E2 are interconnected externally of the valve and can for most purposes be considered as a common port E. Drain ports Z1, Z2 and Z3 allow ports E to H to be connected selectively to zero pressure. The lefthand section of Table 1, set out below, indicates the nature of the connections established by the mode selector in the various modes.

TABLE 1

| Modes | Ports | | | Solenoid States | | Gear Actuators |
|---|---|---|---|---|---|---|
| | E | F | G H | A | B | |
| 1, D(1st) | RP | Z | H–G | 1 | 0 | 1 (2) |
| 2, D(2nd) (after 1st) | RP | Z | H–G | 1 | 0 | 2 (1) |
| 2, D(2nd) (after 3rd) | RP | Z | H–G | 1 | 1 | 2 (3) |
| 3, D(3rd) (after 2nd) | RP | Z | H–G | 1 | 1 | 3 (2) |
| 3, D(3rd) (after 4th) | RP | Z | H–G | 0 | 1 | 3 (4) |
| D (4th) | RP | Z | H–G | 0 | 1 | 4 (3) |
| N | Z | G–F | Z | 0 | 0 | — |
| R | RP | G–F | Z | 1 | 0 | R (2) |
| P | Z | Z C | Z | 0 | 0 | — |

Thus in all forward driving modes, regulated pressure is supplied to port E, Port F is connected to zero pressure and ports G and H are interconnected. In neutral, as shown in FIG. 2, the supply of regulated pressure is closed off. Ports E and H are connected to drain while ports G and F are interconnected. This closing off of the supply of pressure in neutral is a particularly important safety feature because, as will become apparent subsequently, it helps to ensure that even if other parts of the transmission malfunction, a driving mode is not selected when neutral is intended. In reverse mode, pressure is supplied to port E while ports G and F are interconnected and in the parking mode regulated pressure is again cut off at the inlet to the valve while ports E F and H are connected directly to drain. Port G is closed off as indicated by letter C in Table 1.

In all driving modes, pressure is supplied from the manual selector to inputs SA and SB of first and second electrohydraulic solenoid valves A and B. The solenoid valves are opened or closed selectively by the electronic control system EC depending on the gear ratio or ratios which should be selected. Simultaneous engagement of two ratios is required during gear changing. The outlets from the solenoid valves are connected to the gear actuators GA1 to GA4 and GAR, either directly or through other hydraulic valves to be described. The central section of Table 1 indicates which of the solenoids is actuated to open its valve. An open valve is represented by a 1 and a closed valve by a 0. The gear actuators pressurised in these states are also indicated in the last column of Table 1. Where a gear actuator is pressurised and the associated gear is engaged but its clutch is disengaged so that there is no drive through that gear, the gear actuator is shown in brackets.

The outlet from solenoid valve A is connected directly to gear actuator GA2 so that this actuator is always operated when valve A is open. Similarly, the outlet from valve B is connected directly to actuator GA3 to operate this actuator when valve B is open.

The outlets from both solenoid valves A and B are also both connected to a pressure responsive vave SV.

The valve SV is a spring centred spool valve and in this centred condition, inlet flow ports J and K from solenoid valves A and B respectively are both closed off. There is a connection from solenoid A to a control port at the left-end of the spool to urge it in a rightward direction when valve A is open. A corresponding connection from valve B to the opposite end of the spool urges the spool in the opposite direction when valve B is open. When both solenoid valves A and B are open, the hydraulic pressures on the ends of the spools balance out so the spool remains in its central position as shown. When valve A is open but valve B is closed, the spool is moved to the right to provide a connection for fluid under pressure from inlet port J to outlet port L and thus to port G of the manual selector valve MV. When reverse mode is selected in the manual selector valve MV, there is a connection between ports G and F with the result that the reverse gear actuator GAR, connected to port F, is pressurised. Thus the reverse gear actuator is pressurised when solenoid valve A is open, valve B is closed and reverse mode is selected. In the neutral condition as shown, there is also interconnection between ports G and F but in this condition no pressure is supplied to the solenoid valves because ports E1 and E2 are closed off from the pressure supply. When a forward driving mode is selected, port G is connected to port H rather than to port F so any pressure from port L of valve SV operates gear actuator GA1.

When solenoid valve B is open and valve A is closed, the spool of valve SV is moved in a leftward direction so that port K becomes connected to port M and the supply to port L is cut off. Port M is connected to gear actuator GA4. Thus actuator GA4 is operated when valve B but not valve A is open.

Thus it can be seen that for the modes and solenoid states indicated in FIG. 1, the gear actuators specified in the last column of Table 1 are pressurised.

In every driving mode, two gear actuators are operated with the result that two gear ratios are engaged. However, the electronic control holds a clutch associated with one or other of the engaged gear actuators in a disengaged state so that there is a driving connection through only one gear ratio. It should be noted that there are two distinct ways in which each of second and third gear ratios can be engaged. In both cases the gear ratio above or that below the effective ratio may also be engaged through its gear actuator whilst a driving connection through this other gear is prevented by disengagement of the associated clutch. When the transmission has changed up into the gear ratio which is effective at the time, it is the ratio below the effective ratio which continues to be engaged but is rendered ineffective by disengagement of the associated clutch. In contrast, after a change down into third or second gear ratio, it is the ratio above the engaged ratio which also remains engaged but for the disengagement of its clutch.

During ratio changes, it is necessary to have two gears themselves in an engaged state while one clutch is being disengaged while the other is becoming engaged. For ratio changes between first and second gear, the conditions in the first two rows of the Table are established and the transition is effected by simultaneously disengaging one clutch while the other becomes engaged. Similarly, for a ratio change in either direction between second gear and third gear, the conditions shown in the third and fourth rows of the Table are established and the change of ratio is effected by disengaging one clutch while the other becomes engaged. In a similar way, the fifth and sixth rows indicate the conditions during a change of ratio between third gear and fourth gear.

It should be noted that after a gear change from first gear to second gear, when a change is subsequently required to third gear, a necessary preliminary is for the solenoid states to be changed from those shown in the second row to those shown in the third row. During this change of state, second gear remains engaged but the transmission becomes conditioned for a change between second and third ratios as opposed to a change between second and first ratios. Similar considerations apply to other sequences of gear ratio change.

FIG. 2 also shows the hydraulic controls for the clutches. For the dry clutch for engagement of first, third and reverse, fluid at regulated pressure from pump PP is supplied to a dry clutch control valve DV from which there is a connection to the clutch cylinder shown as 37 in FIG. 1. Valve DV is in turn controlled from a solenoid valve DS. Solenoid valve DS is in turn operated intermittently by pulses in such a way as to control the valve DV and give a controlled rate of clutch actuation. Accumulator DA also assists in control of the operation of the dry clutch.

The wet clutch is operated in a manner similar to the dry clutch operation by a wet clutch control valve WV, a solenoid valve WS and an accumulator WA. Accumulator WA incorporates a pressure transducer which gives a signal indicating the extent of clutch engagement and this signal can be used to synchronise the operation of the two clutches.

The electronic clutch control signals to solenoids DS and WS and the binary signals for solenoid valves A and B are selected by the electronic control system in conjunction with the position of the manual selector valve and other criteria such as speed and torque demand in such a way as to control the transmission into effecting smooth ratio changes at appropriate speeds.

For convenience, reference has been made throughout this specification to five individual gear actuators. In practice, where one selector ring moves in one direction to select one ratio and in the opposite direction to select a different ratio, two individual actuators would be replaced by one dual actuator. Reference throughout the specification to individual actuators is intended to include reference to the appropriate function of a dual actuator.

Although the transmission has been described as having one wet clutch and one dry clutch it would be possible to replace the dry clutch with a second wet clutch or even to replace the wet clutch with a second dry clutch.

I claim:

1. An automatic power transmission comprising an input; an output; first, second, third and fourth gear sets; first, second, third and fourth gear actuators each operatively connected to a respective gear set for selective engagement and disengagement thereof; a first clutch selectively engageable to establish a dirve path from said input to said output through an engaged one of said first and third gear sets; a second clutch selectively engageable for establishment of the driving connection from said input to said output through one of said second and fourth gear sets; said transmission being such that ratio changes are effected under power by releasing one of said clutches interconnecting the input and output through an engaged gear set simultaneously with engaging the other of said clutches interconnecting the input and output through another of said gear sets; a control system comprising first and second electro hydraulic valves, a first outlet from the first electro hydraulic valve leading directly to the second gear actuator, a second outlet from the second electro hydraulic valve leading directly to the third gear actuator, a pressure responsive valve having opposed first and second ports connected respectively to said first and second outlets, a first connection through said pressure responsive valve open only in response to pressure at said first control port but not said second control port providing communication between said first outlet and said first gear actuator and a second connection through said pressure responsive valve open only in response to pressure at said second control port but not said first control port providing communication between said second outlet and said fourth gear actuator, whereby one set of electro hydraulic valve states is arranged to engage first and second gear sets, a second set of electrol hydraulic valve states is arranged to engage second and third gear sets, a third set of electro hydraulic valve states is arranged to engage third and fourth gear sets and operation of the transmission in any of these gear ratios is effected by engaging two gear sets and holding one of the clutches disengaged while the other clutch is engaged whereby drive is established through only one of the engaged gear sets, said transmission further comprising a reverse gear set and associated reverse gear actuator operatively interconnectable between said input and output through said second clutch, the transmission further comprising a transmission mode selector, wherein the same set of electro hydraulic valve states as is employed for engagement of first and second gear sets is employed to engage the reverse gear set and wherein the hydraulic supply from the electro hydraulic valves to the actuators is routed selectively to first gear actuator and reverse gear actuator through said transmission mode selector in dependence on whether reverse transmission mode or a forward transmission mode is selected.

* * * * *